United States Patent Office 3,519,238
Patented July 7, 1970

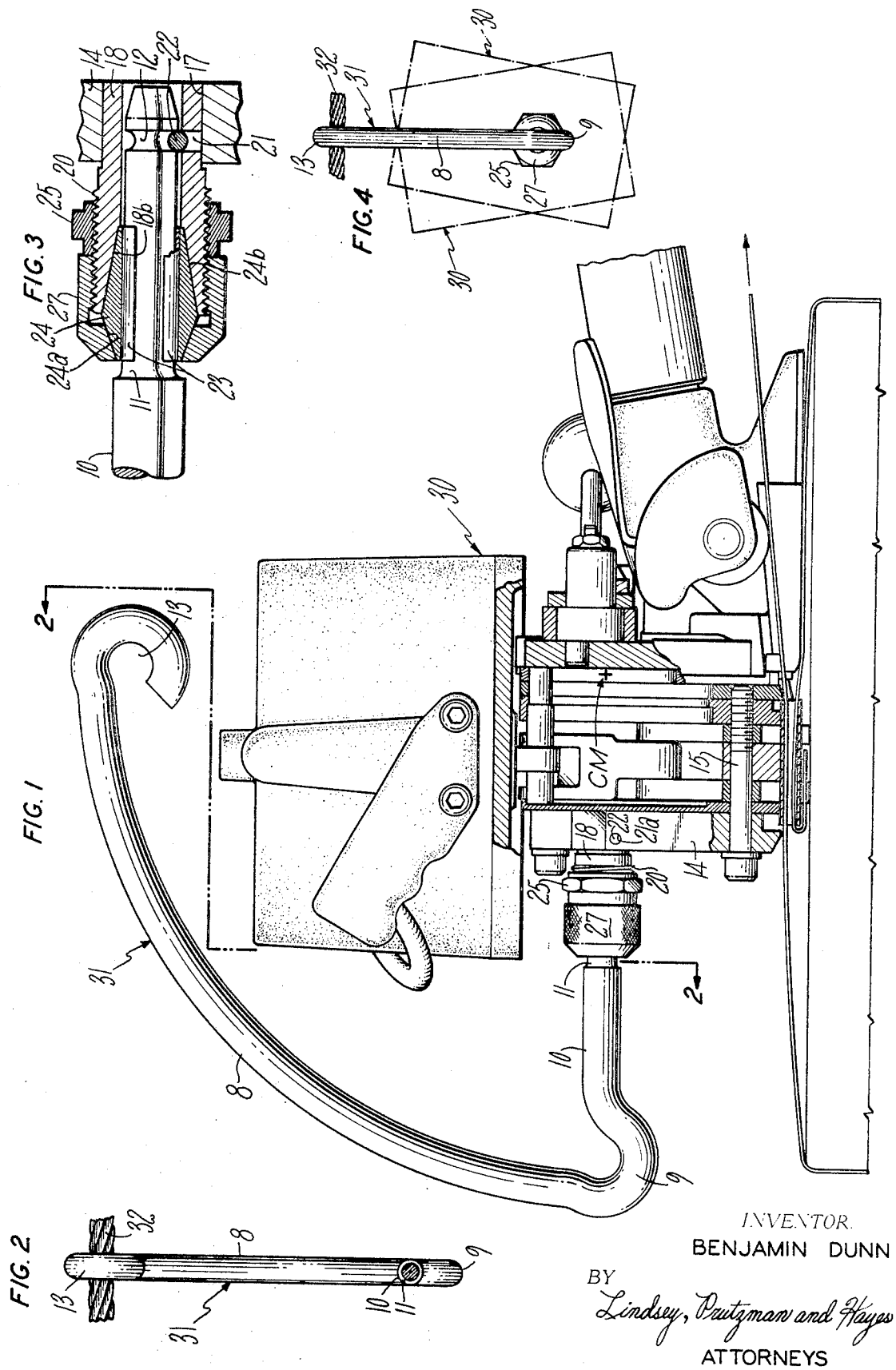

3,519,238
TOOL HANGER ASSEMBLY
Benjamin Dunn, Newington, Conn., assignor to The Stanley Works, New Britain, Conn., a corporation of Connecticut
Filed Apr. 8, 1968, Ser. No. 719,626
Int. Cl. B25g *3/24*
U.S. Cl. 248—359                                          5 Claims

ABSTRACT OF THE DISCLOSURE

A strapping tool hanger assembly comprising a one piece contoured arm including a tool engaging portion extending therefrom. The carrier engaging portion features a relatively infinite number of positions along which the carrier can be slidably engaged for supporting the tool in a rest position relative to a workpiece, each such position being radially equidistant from the tool's center of mass. The assembly also includes a bearing mechanism for quickly connecting the tool to the arm for controlled frictional engagement with and positioning of the tool.

Brief summary of the invention

This invention pertains to strapping tools and is particularly directed toward the object of providing a new and improved support or hanger assembly for supporting such tools in balance and at rest in any of a relatively infinite number of angular positions.

Another object of this invention is to provide a support arm for bulky, heavy-duty air powered tools, featuring ready, slidable adjustment of such a tool to positions ranging in infinite increments at least between horizontal and vertical planes.

Another object of this invention is to provide a tool support arm facilitating orientation of a tool about a plurality of axes, the planes of which intersect at the tool's center of mass.

Another object of this invention is to provide a low cost strapping tool support arm affording versatility and flexibility in operation, including balanced and precise positioning which is quickly obtained despite the bulk and weight of the tool.

Another object of this invention is to provide a tool support arm with seizure preventing means for facilitating positioning of a bulky, heavy tool supported by the arm at a work station.

Other objects will be in part obvious and in part pointed out more in detail hereafter and are achieved by the new and improved tool hanger assembly of the invention which in the illustrated embodiment takes the form of a one piece support arm and a separate bearing assembly frictionally engaging one end of the arm and facilitating attachment of the arm to the tool. The support arm includes a tool suspending curved portion and a tool connecting portion integrally joined to the curved portion and extending radially inwardly therefrom. The curved portion advantageously carries the bearing assembly and provides seizure-free rotational positioning of the assembly about the longitudinal axis of the connecting portion.

The invention accordingly consists in the features of construction, combination of elements and arrangement of parts which will be exemplified in the construction hereafter set forth, and the scope of the application which will be indicated in the appended claims.

Brief description of the drawing

In the drawing:
FIG. 1 is a side elevation, partly schematic and partly fragmented, illustrating the tool hanger assembly of the invention supporting an air powered strapping tool in an exemplary position over a package;

FIG. 2 is a reduced rear elevation, partly fragmented, taken along line 2—2 of FIG. 1 and showing a section of a carrier cable engaging the arm at one position therealong;

FIG. 3 is an enlarged side elevation, partly in section and partly fragmented, illustrating an improved tool attachment portion for the hanger assembly shown in FIG. 1; and FIG. 4 is a reduced front elevation, partly fragmented and partly schematic, showing two exemplary pivot positions, somewhat exaggerated to achieve clarity, of a strapping tool utilizing the hanger assembly of the present invention.

Description of the preferred embodiment

Referring now to the drawing in greater detail, wherein like reference numerals indicate like parts throughout the several figures, an illustrative embodiment of the invention shows a radial arm hanger 31 supporting a powered strapping tool 30 of the well-known type having tensioning mechanism for drawing strap material taut about a package, and sealing mechanism for subsequently crimping a seal about the lapped ends of the strap material and then severing the supply end of that material.

The radial arm hanger 31 is shown engaging the tool 30 for providing seizure-free positioning of the tool rotatably about the longitudinal axis passing through the site of engagement of the tool with the hanger. A carrier 32, which can be of the cable type or other suitable form supportably engages the arm hanger 31 for slidable positioning of the carrier along the length of the hanger, thereby rotatably moving the tool about the longitudinal axis of the carrier 32, as a result of which motion the tool is readily angularly positioned relatively to one axis of a package, and rests in that position. The arm 31 includes a linear portion 10 extending from an elbow 9 of the arm radially toward the tool center of mass CM, which linear portion 10 is continued along the same radius as a reduced shank portion 11 adapted to engage the tool 30 through a support plate 14 which is screw attached thereto as at 15. An aperture 17 disposed centrally in the plate 14 relatively to the side edges thereof receives a separate sleeve member or collet 18 which is adapted to movably receive the arm shank portion 11. Treads 20 on the collet 18 cooperatively engage both a stop nut 25 and a retainer or locking nut 27 having a central aperture flared to bear against a mating surface 24a of a wedge element 24 as the nut 27 is drawn tight by means of its threaded relation with the collet. The shank portion 11 of the support arm or hanger 31 is axially positioned in the generally cylindrical sleeve member 18 so that a groove 12 in the shank overlies an aperture 21 in the sleeve member. Advantageously, the aperture 21 continues into the plate 14 and provides a composite opening 21a into which a hanger retaining pin 22 can be inserted from without to facilitate quick assembly of the arm 31 on the tool 30. The tool 30 can then be rotatably positioned about its axis as shown in FIG. 4 without becoming disassembled from the hanger 31. Bearing liners 23 of nylon or other suitable material having a minimum coefficient of friction and being to some extent self-lubricating, may be secured to the inner and cylindrical contact surface of the wedge 24. As best seen in FIG. 3, the wedge and the collet 18 also have mating surfaces 24b and 18b, respectively, which tend to compress the wedge 24 against the liners 23 and therefore against the shank 11 as the nut 27 is drawn down. In this manner it is possible to control the frictional engagement between the tool and arm for adjustably positioning the tool about the longitudinal axis of the shank portion 11 without causing seizure or galling of the coacting collet and shank surfaces.

To facilitate ready positioning of hanging tools, such as the strapping tool 30, relatively to workpieces having various shapes or being variously oriented to the tool relatively to the sealing site thereof, the elbow 9 of the support arm 31 is shaped to receive the carrier 32 while the arm integrally extends away from the linear portion 10 in a uniformly arcuate manner along portion 8 until it terminates in an open eye 13 also adapted to receive the carrier 32. The arm illustrated is shown as including a 90° arc between its elbow 9 and its eye 13, with the tool center of mass CM underlying the eye 13 in the horizontal rest position of the tool shown in FIG. 1, and forming the vertex of the right angle formed by sides extended radially from the mass center to the elbow and to the eye. The radii between the mass center and the arcuate portion 8 of the arm 31 are mutually equidistant, including those from the elbow 9 and the eye 13. So long as this mutually equidistant relation is maintained, the arm or hanger can be of any suitable dimension, and between the carrier engaging extremes thereof it offers an infinite number of positions along which the carrier is slidably engageable to support the tool 30 in balanced relation. That is, the arm can be slid about the carrier 32, thereby angularly positioning the tool 30 about the longitudinal axis of the carrier 32 until the tool assumes a position adjacent to and appropriate for a particular workpiece. Each such position is a balanced or rest position which the tool maintains without application of external force. Irrespective of where the carrier 32 lies along the arm 31 the tool center of mass always underlies the carrier along a radius of constant length. There is no imbalance tending to displace the tool about its then angular position. When the tool has been angularly positioned, relatively to a package, by means of the arm 31 and the collet mechanism so that it is balanced with its tensioning and sealing mechanisms operatively adjacent the strap material about the package, an operator need only hold the tool against the workpiece, without supporting its weight, and actuate the tensioning and sealing mechanism thereof in the usual manner.

As can be seen, the foregoing arrangement of structural elements utilizes friction to provide readily retained but seizure-free angular positioning of a strapping tool about the longitudinal axis extending along the tool connecting arm portion 11 and utilizes gravity to simultaneously hold the heavy tool in a balanced and rest position angularly about the longitudinal axis of the tool carrier cable, whereby balanced, very precise rest positioning of the tool relatively to a workpiece is quickly and easily obtained regardless of the exterior configuration of the workpiece.

As will be apparent to persons skilled in the art, various modifications and adaptations of the above-described structure will become readily apparent without departure from the spirit and scope of the invention, the scope of which is defined in the appended claims.

I claim:

1. A hanger mechanism particularly suited for supportably suspending a relatively heavy strapping tool in various angular positions oriented about each of at least two intersecting planes comprising a one piece support arm and a separate bearing assembly frictionally engaging one end of the arm, said assembly including retaining means facilitating attachment of the arm to the tool and relative rotation therebetween, the arm including a tool suspending curved portion positioned equidistant from the center of mass of the tool along its entire arcuate extent thereby facilitating gravity suspension of the tool at rest at any position along the curved portion and a tool connecting portion integral with the curved portion and extending radially toward the tool from the curved portion, said connecting portion carrying the bearing assembly for providing seizure-free positioning of the assembly and the tool about the longitudinal axis of the connecting portion, said retaining means being operative to fixedly attach the assembly to the strapping tool while connecting the support arm thereto with the longitudinal axis of the connecting portion passing through the center of mass of the tool.

2. The mechanism of claim 1 wherein the bearing assembly includes a friction controlling member facilitating angular positioning of the assembly and the tool about the longitudinal axis of the connecting portion, said retaining means preventing axial displacement of the assembly relative to the connecting portion of the arm.

3. The mechanism of claim 1 wherein the bearing assembly includes plastic bearing means frictionally engaging the connecting portion of the arm and having a low coefficient of friction, and adjustable means for compressively urging the plastic bearing means into intimate physical contact with the connecting portion.

4. The hanger mechanism of claim 1 wherein the tool suspending curved portion includes a 90° arc radially equidistant from the center of mass of a tool supported by the arm, the tool connecting portion is a linear shank integrally joined to the curved portion through an elbow located at one end of the 90° arc, and the bearing assembly is in controlled frictional engagement with the shank, said bearing assembly comprising a sleeve member fixedly connected to the tool and having a countersink on its outermost end, a wedge positioned intermediate the shank and the sleeve member and having an inclined outer surface in engagement with the countersink of the sleeve, a plastic liner having a low coefficient of friction interposed between the wedge and the shank, and locking means movable on the sleeve member and against the wedge for compressively urging the wedge and interposed liner against the shank.

5. The hanger mechanism of claim 1 wherein the tool supporting curved portion includes a 90° arc.

References Cited

UNITED STATES PATENTS

| | | | |
|---|---|---|---|
| 263,341 | 7/1882 | Andrews | 145—106.6 |
| 2,601,407 | 6/1952 | Marshall | 248—317 X |
| 2,610,657 | 9/1952 | Kiekhaefer | 143—32 |
| 3,191,819 | 6/1965 | Smith | 16—114 |

CHANCELLOR E. HARRIS, Primary Examiner

U.S. Cl. X.R.

81—177.8; 248—340